Patented May 4, 1954

2,677,689

UNITED STATES PATENT OFFICE 2,677,689

TROPIC ACID N-(β-PICOLYL)-N-LOWER-ALKENYLAMIDES AND PROCESS FOR THE MANUFACTURE THEREOF

Gérald Rey-Bellet, Basel, Switzerland, assignor to Hoffmann-La Roche Inc., Nutley, N. J., a corporation of New Jersey No Drawing. Application January 9, 1953, Serial No. 330,577

Claims priority, application Switzerland February 6, 1952

The portion of the term of the patent subsequent to August 4, 1970, has been disclaimed 4 Claims. (Cl. 260—295)

The present invention relates to novel tropic acid amides of the following general formula:

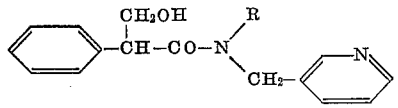

wherein R stands for an alkenyl radical. More particularly, the invention relates to the following compounds: Tropic acid N-(β-picolyl)-N-propenylamide, tropic acid N-(β-picolyl)-N-isopropenylamide, tropic acid N-(β-picolyl)-N-butenylamide, tropic acid N-(β-picolyl)-N-pentenylamide. The above mentioned novel compounds possess spasmolytic properties which make them suitable for pharmaceutical use.

The invention further concerns a process for the manufacture of the above compounds, which comprises condensing a tropic acid halide, which may be O-acylated, with an alkenyl-(β-picolyl)-amine and, if desired, separating off the O-acyl group.

The alkenyl-(β-picolyl)-amines used as starting material may be obtained for example by reaction of a 3-halomethylpyridine with a primary alkenylamine or by alkenylation of N-(p-toluenesulphonyl)-3-aminomethyl-pyridine by means of an alkenylhalide or alkenylsulphate and subsequent detosylation.

Example

A solution of 32.8 parts by weight of 3-chloromethylpyridin-hydrochloride in 40 parts by weight of water is slowly added to 70 parts by weight of allylamine, while stirring and keeping the temperature below 10° C. Stirring is continued for 2 hours at room temperature and for a further hour at 40° C. The reaction mixture is cooled with ice and saturated with solid potassium hydroxide; the upper layer is separated off and distilled. The allylamine having not reacted distills first under ordinary pressure and then, at 120° C. under a pressure of 13 mm. Hg, the allyl-(β-picolyl)-amine runs over.

To a mixture of 74 parts by weight of allyl-(β-picolyl)-amine (boiling point 13 mm./120° C.) and 45 parts by weight of dry pyridine and 250 parts by weight of dry chloroform is slowly added, while stirring and cooling with ice water, acetyltropic acid chloride, which has been obtained from 85 parts by weight of tropic acid by treating the same first with acetyl chloride and then with thionyl chloride in excess. Finally, stirring is continued for 1 hour at room temperature.

The chloroform solution is then diluted with 250 parts by weight of ether and extracted with 3 N hydrochloric acid. The weakly Congo acid solution is heated for 1 hour on the water bath to hydrolyse off the acetyl group of the reaction product. The solution is filtrated through charcoal and concentrated ammonia is added in excess. The condensation product which precipitates is taken up in chloroform and the latter is dried and distilled off. The tropic acid N-allyl-N-(β-picolyl)-amide so obtained is a viscous oil, the hydrochloride of which melts at 136–137° C.

I claim:

1. A compound selected from the group consisting of tropic acid N-lower-alkenyl-(β-picolyl)-amides and the acid addition salts thereof.

2. Tropic acid N-allyl-N-(β-picolyl)-amide.

3. Tropic acid N-allyl-N-(β-picolyl)-amide hydrochloride.

4. A process which comprises reacting an O-acetyl-tropic acid halide with a lower alkenyl-(β-picolyl)-amine and hydrolyzing to produce a tropic acid N-lower alkenyl-(β-picolyl)-amide.

References Cited in the file of this patent

UNITED STATES PATENTS

| Number | Name | Date |
|---|---|---|
| 2,647,904 | Rey-Bellet | Aug. 4, 1953 |